March 11, 1958          O. A. HOLLAND          2,826,429
AUTOMATIC RETRACTING AND LOWERING DEVICE
FOR LANDING GEAR ON SEMI-TRAILERS
Original Filed Aug. 5, 1952          2 Sheets-Sheet 1
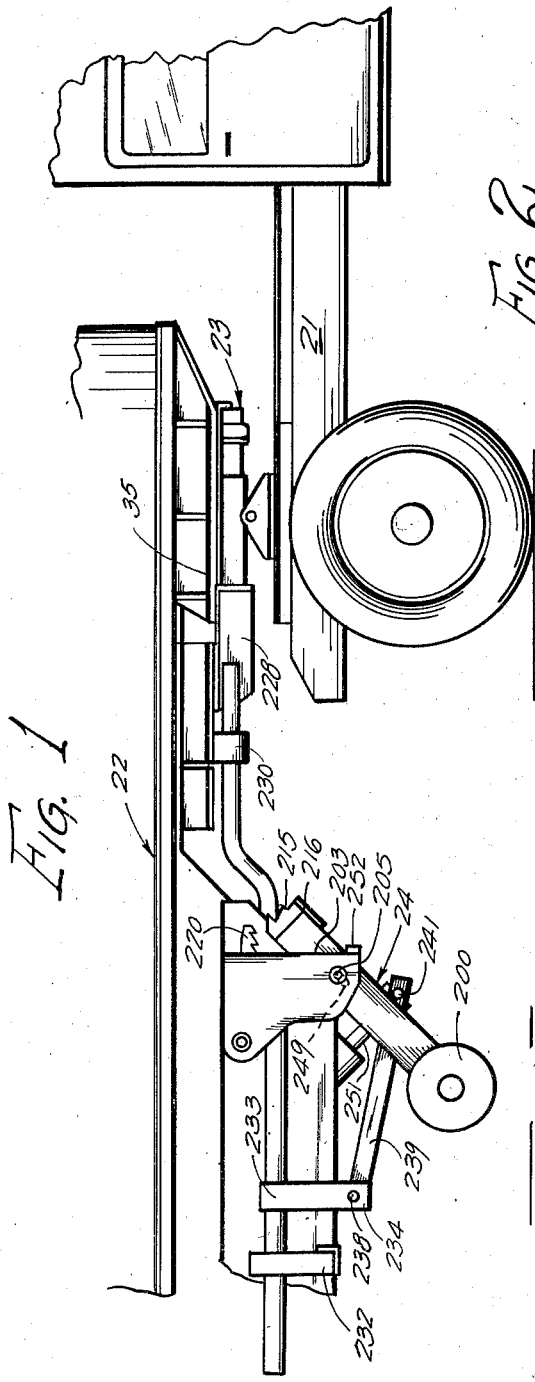
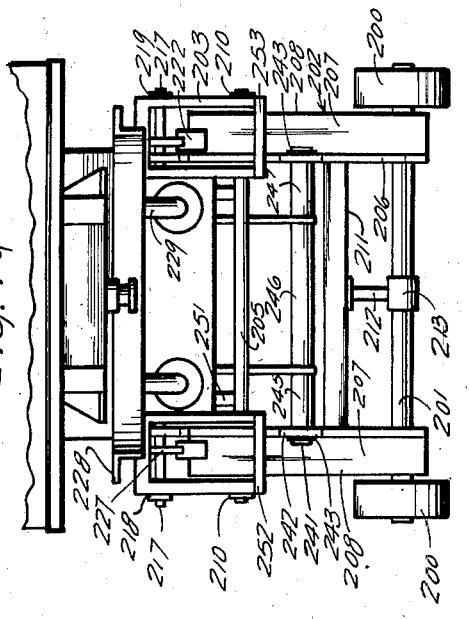
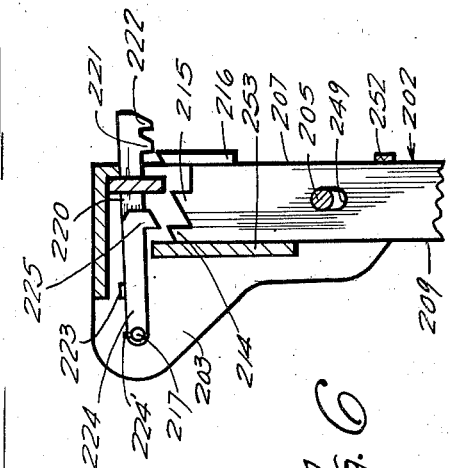
INVENTOR.
OSWALD A. HOLLAND
BY
ATTORNEYS March 11, 1958     O. A. HOLLAND     2,826,429
AUTOMATIC RETRACTING AND LOWERING DEVICE
FOR LANDING GEAR ON SEMI-TRAILERS
Original Filed Aug. 5, 1952     2 Sheets-Sheet 2
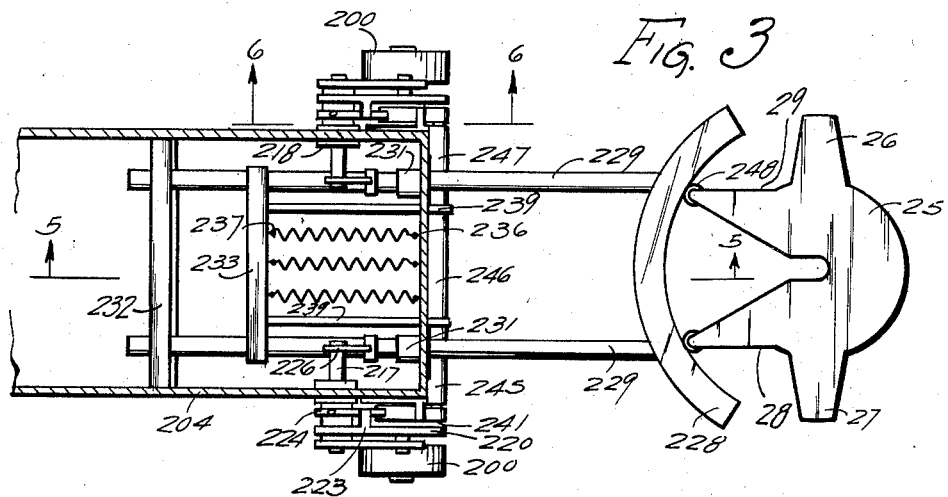
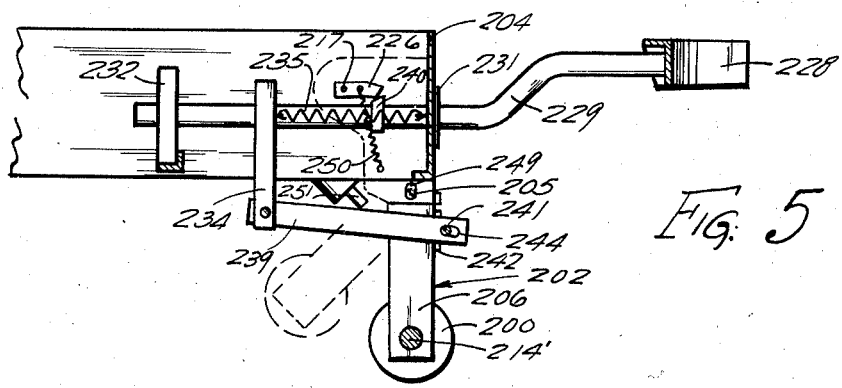
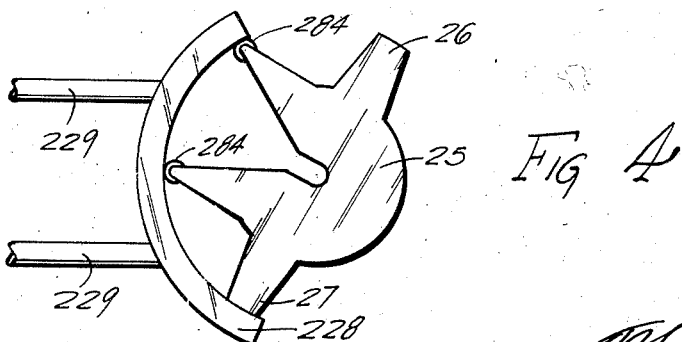
INVENTOR.
OSWALD A. HOLLAND
BY
ATTORNEYS

United States Patent Office

2,826,429
Patented Mar. 11, 1958

2,826,429

AUTOMATIC RETRACTING AND LOWERING DEVICE FOR LANDING GEAR ON SEMI-TRAILERS

Oswald A. Holland, Hammonton, N. J.

Original application August 5, 1952, Serial No. 302,855, now abandoned. Divided and this application June 23, 1954, Serial No. 438,882

2 Claims. (Cl. 280—429)

(Granted under Title 35, U. S. Code (1952), sec. 266)

The invention described herein may be manufactured and used by or for the Government of the United States of America for governmental purposes without the payment of any royalties thereon or therefor.

This invention relates to the art of motor vehicles and particularly to coupling and uncoupling equipment for truck-tractors and semi-trailers.

This application is a division of my co-pending application Serial No. 302,855, filed August 5, 1952, now abandoned.

This invention contemplates the modification of conventional trailer landing gear so that the landing wheels will automatically be raised when the tractor is backed into coupling position and will be dropped into supporting position when the tractor is driven away from the trailer even when the uncoupling operation is performed while the vehicles are moving.

An object of this invention is to provide means for preventing retraction or lowering of the landing wheels except when the tractor and trailer are in the proper relationship for so doing and the driver has operated the controls in the cab into the position for performing the contemplated operation.

Still another final purpose of the invention is the application of the aforementioned features to conventional tractors and trailers at low cost and without destroying the capability of the tractor or trailer to be coupled to a conventional trailer or tractor respectively.

It is noted that other automatic coupling units or fifth wheels for tractor-trailer combinations have been attempted heretofore. A brief comparison of these old systems with that of applicant described in this and my co-pending application will serve to point out several basic differences which should be kept in mind.

First of all, the known devices require that at least the fifth wheel and landing wheels be replaced while in applicant's system only relatively inexpensive modifications to conventional equipment are needed.

Secondly, tractors equipped with automatic couplers other than that of applicant can be utilized only with trailers supplied with similarly modified equipment while a tractor or trailer furnished with applicant's modified units can still be efficiently coupled to standard units.

Last, but very important, vehicles equipped with applicant's invention can be uncoupled while the vehicles are in motion and fully loaded without any damage to tractor, trailer or load, a feat which was considered impossible in the past.

The invention herein described has many advantages and wide utility. When used in shifting operations in yards, much time can be saved and accidents averted since the driver need never leave the cab as landing wheels are automatically lowered when the tractor is driven away from the trailer and accidental uncoupling is prevented.

The invention could also be employed to great advantage in hauling explosive or inflammable materials, by the Armed Forces in combat, or wherever dangerous activities are carried on, for example, on aircraft landing field; in short, wherever the ability to quickly couple to and remove a trailer from its location may become necessary or where it may be important to quickly separate a tractor from its trailer. It will be apparent that in many emergencies expeditious coupling or uncoupling of a tractor and trailer may prevent loss of valuable equipment or personnel.

Other objects and many of the attendant advantages of this invention will be readily appreciated as the same becomes better understood by reference to the following detailed description when considered in connection with the accompanying drawings wherein:

Figure 1 is a side elevation of the new landing gear shown in coupled position on a tractor and trailer;

Figure 2 is a front elevation of the trailer supported by the improved landing gear;

Figure 3 is a top plan view of the landing gear showing how contact between the segment on the landing gear and the lower fifth wheel serves to operate the landing gear;

Figure 4 shows a plan view of the cooperating elements on the fifth wheel and the landing gear operator.

Figure 5 is a section taken on line 5—5 of Figure 3 and illustrates the landing gear in its alternative positions, demonstrating the relative positions or some of the parts;

Figure 6 is a detail view of the landing gear locking mechanism taken on section line 6—6 of Figure 3.

Looking now at Figure 1, truck-tractor 21 is shown coupled to semi-trailer 22 by means of the fifth wheel or coupling unit 23. Landing gear 24 appears in its normal attitude when the tractor and trailer are coupled, that is with the landing wheels in raised position.

The landing gear mechanism as seen in Figures 2 and 5 comprises a pair of landing wheels 200 rotatably mounted on an axle 201 which is journaled in bearings 214' carried in a pair of supports 202, said supports being in the form of box frames or girders having sides 206, 207, 208 and 209 pivotally mounted intermediate their ends by means of elongated holes 249 in sides 206 and 208 on a bracket 203 which is secured to the frame 204 of the trailer and also serves as a housing for part of the mechanism associated with the landing gear. The pivot means for the supports 202 include an axle 205 secured in place by locking collars 210. A crossbar or brace 211 is provided between the supports 202 and to prevent bowing of the axle 201 when a heavily loaded trailer is carried by the landing wheels one end of a brace 212 is attached to said axle by a collar 213 and the other end thereof is fixed to the crossbar 211. The inner side 206 of each of supports 202 is made heavier than the other three sides and at its top or free end is provided with teeth 214 and 215 and the top edge of the front side 207 of the box girder is provided with a tooth 216. A stub shaft 217 has one of its ends journaled in the housing 203 and is journaled intermediate its ends in the trailer frame 204. Locking collars 218 and 219 serve to maintain the stub shaft in position. A safety catch 220, provided with teeth 221 and 222 at its free end is pivotally mounted on one end of the stub shaft within said housing and has secured to its top edge a bar or lifting lug 223 which exends over a pawl 224 which is keyed at 224' to said stub shaft adjacent the catch 220 and carries a tooth 225 at its free end. A cam follower or lever 226 is keyed on the other end of shaft 217.

When the landing wheels are down in a position to support the trailer, each tooth 225 of the pawls engages tooth 214 on each of the supports 202, each tooth 221 on the safety catch engages its corresponding tooth 216 and a rigid dog 227 on each of the housings 203 cooperates with its respective tooth 215 to maintain the landing gear in proper vertical alignment.

In Figure 3 is seen an arcuate segment 228 and two push rods or rams 229, each having one end attached to the segment and being slidable in sets of guide bearings 230, 231, and 232 fixed to the trailer frame. Rigidly secured between the push rods is a horizontal cross beam 233 and depending therefrom are vertical channel members or arms 234 located inwardly of the push rods. Tension springs 235 are strung from eyebolts 236 on the trailer frame to eyebolts 237 on the cross beam and operate to urge the push rods to their extreme forward position. A rod or shaft 238 is carried between the lower ends of the arms 234 and has pivotally mounted thereon near each of its ends a connecting link 239 which provides a connection between the arms and cross beam and the landing wheel supports. A rod 241 is attached to the edge of side 206 of the support frame by means of yokes 242 and collars 243 and passes through an elongated aperture 244 in each of the links 239. Thus a connection is produced which provides for some lost motion between the cross beam 233 and rod 241 to permit easier engagement of the locking means associated with the teeth 214, 215 and 216. Spacers 245, 246 and 247 may be provided to maintain alignment of links 239.

When the tractor 21 is backed toward trailer 22 for coupling, the upper fifth wheel rides up on skid portions 28, 29 and the trailer is lifted onto the lower fifth wheel carried by the tractor. This causes relative vertical motion between housing 203 and supports 202 because of the elongated holes 249 sufficient to disengage dogs 227 from teeth 215. Pawls 224 and catches 220 remain engaged respectively with teeth 214 and 216, however, since they pivot downwardly with their shafts 217 under the influence of their own weight and the bias of springs 250. Further relative movement of the tractor toward the trailer causes rollers 248 on the ends of skid portions 28, 29 to engage the inner periphery of the segment 228 and force it back, causing the push rods to slide in their bearings against the resistance of springs 235 carrying cross beam 233, vertical arms 234 and links 239 with them. A cam 240 secured to each of the push rods strikes the cam follower 226 when backward motion of the rams 229 begins and causes the cam follower to rotate stub shaft 217 to which it is keyed against the pressure of a spring 250, disengaging pawl 224 from tooth 214. As pawl 224 is raised, it contacts the lifting lug 223 and lifts safety catch 220 out of engagement with tooth 216. Supports 202 are now free to rotate about axle 205 as links 239 continue to pull back on rod 241 until the brace 211 engages bumpers or rebound stops 251 which prevent rebound when the landing gear is lifted as described and preclude bouncing of said landing gear when the vehicles are driven over bumpy roads and supports 202 engage abutments 252 and 253 of the housing 203. Springs 235 and rebound stops 251 provide a shock absorber action to relieve some of the shock of the impact between the tractor and trailer when the tractor is moved into coupling position, thus reducing the possibility of damage to parts. Cam 240 will move out from under follower 226 allowing stub shaft 217 to rotate so that pawl 224 and catch 220 will be in position to engage the teeth on box frame 202 when it is again swung to trailer supporting position. The upper edge of abutment 253 of the housing limits downward movement of the pawl and catch. By providing individual stub shafts 217 rather than a continuous shaft, better engagement of the teeth and latch means is obtained, since failure of the latch means on one side to rotate to fully engaging position will not affect engagement of the latch means on the other side.

The landing wheels will be held in the raised position by the rollers on the ends of the lower fifth wheel engaging the segment 228 wherever the vehicles are coupled together. To provide a more even pressure on said segment and greater stability of the vehicles when the tractor and trailer are being jack-knifted or driven in a sharp turn, lateral extensions 26, 27 have been provided on the lower fifth wheel to engage the segment when the vehicles are at a relatively steep angle with respect to each other as shown in Figure 4.

When the vehicles are being uncoupled and the lower fifth wheel moves away from segment 228, the push rods will move forward under the influence of springs 235 and the wheels will be driven to their supporting position by the weight of the landing gear and by the thrust of springs 235 acting through arms 234 and links 239 until the sides 207 of the box frames impinge upon the stop members 252 and 253 fastened across the front and rear respectively of each housing 203. Cam 240 will move to a position with respect to the follower 226 which will permit rotation of the stub shaft sufficient to engage catch 220 and pawl 224 with teeth 216 and 214 respectively and as the lower fifth wheel moves completely out of trailer supporting position, the weight of the trailer will be transferred to the landing gear as axle 205 moves downwardly in the elongated holes 249 permitting dogs 227 to engage teeth 215.

If by reason of unevenness in the road surface or some other cause proper engagement of teeth 214, 215 and 216 is not affected due to the supports 202 not reaching the full vertical position, tooth 222 of the safety catch will engage tooth 216 so that the trailer may still be supported by the landing gear.

Therefore, when the tractor and trailer are uncoupled, the trailer brakes will be applied by a means described in my co-pending application, now abandoned, bringing the trailer to a stop supported by its landing wheels which will also have been lowered by the uncoupling process as hereinbefore described.

It may be seen, therefore, that applicant has provided safe, efficient means controlled by the driver of the vehicles for raising and lowering the landing gear of a semi-trailer wherein the entire uncoupling process requires no manual operations outside the cab and may be performed while the vehicles are moving.

Applicant prefers to fabricate the landing gear unit from steel plate though it may be cast as is the conventional practice. The parts may be stamped out and welded or otherwise joined. The fabricated construction eliminates cracking and distortion encountered with cast steel parts and enhances durability and strength of the fifth wheel and landing gear.

Obviously many modifications and variations of the present invention are possible in the light of the above teachings. It is, therefore, to be understood that within the scope of the appended claims the invention may be practiced otherwise than as specifically described.

What is claimed is:

1. In coupling apparatus for a tractor and a trailer having a frame, landing gear pivotable into and out of trailer supporting position comprising a pair of housings secured to the frame and depending from opposite sides of one end thereof; a support member for each housing, each said support member having a first side wall, a second side wall, and a third side wall, each said support member also having an elongated aperture in said first and third side walls, one end of each support member being contoured to provide a pair of teeth on its said first side wall; a first axle which is mounted between the housings on the frame and which extends through the elongated holes in the first and third side walls of each support member; means for limiting pivoted movement of the support members about the first axle; a second axle which interconnects the other end of each support member; a wheel mounted on opposite ends of the second axle; a tooth member which is secured to the second side wall of each support member and which extends beyond the said one end of the support member; a dog for each support member secured to the trailer frame and disposed for engagement with one of the teeth in the first side wall of its respective support member when the support members occupy their vertical trailer supporting position and the first axle occupies its lowermost position in the support member elongated apertures; a stub shaft journaled in each housing; a cam follower keyed to each stub shaft; a pawl keyed to each stub shaft, each pawl being disposed on its stub shaft so as to engage the other of the said teeth in the first side wall of its associated support member when the tractor and trailer are uncoupled; a safety catch operatively connected to each pawl and mounted on its associated stub shaft so as to engage its associated tooth member when the tractor and trailer are uncoupled; a pair of spaced parallel push rods mounted on the trailer and disposed for slideable movement longitudinally of themselves and of the trailer; linkage means connecting the push rods with the pivoted support members such that sliding motion of the push rods is translated to pivotal movement of the support members; a lower fifth wheel on the tractor having a projection thereon which engages the push rods during a tractor-trailer coupling operation; and a cam on each push rod disposed thereon to engage its associated cam follower during the coupling operation, rotate its associated stub shaft, and disengage its associated pawl and safety catch during a tractor-trailer coupling operation.

2. In coupling apparatus for a tractor and a trailer, landing gear for one end of the trailer comprising a pair of support members, each said support member being contoured adjacent one end thereof to provide a pair of teeth, each support member also having an aperture that is elongated along its support member longitudinal axis; means receivable in said elongated apertures for pivotably mounting said support members on opposite sides of said one end of the trailer; an axle interconnecting the other end of each support member; a wheel mounted on opposite ends of the axle; a tooth member which is secured to each support member and which extends beyond the said one end of each support member; a dog for each support member secured to the trailer and arranged to engage one of the teeth of its respective support member when the support members occupy their vertical trailer supporting position and when the support member pivot means occupy their lowermost positions in their respective elongated apertures; a stub shaft for each support member rotatably mounted on the trailer; a cam follower keyed to each stub shaft; a pawl keyed to each stub shaft, each pawl being disposed on its stub shaft so as to engage the other of the said teeth in its associated support member when the tractor and trailer are uncoupled; a safety catch operatively connected to each pawl and mounted on its associated stub shaft so as to engage its associated tooth member when the tractor and trailer are uncoupled; a pair of spaced parallel push rods mounted on the trailer and disposed for slideable movement longitudinally of themselves and of the trailer; linkage means connecting the push rods with the pivoted support members such that sliding motion of the push rods is translated to pivotal movement of the support members; a lower fifth wheel on the tractor having a projection thereon which engages the push rods during a tractor-trailer coupling operation; and a cam on each push rod disposed thereon to engage its associated cam follower during the coupling operation, rotate its associated stub shaft, and disengage its associated pawl and safety catch during a tractor-trailer coupling operation.

References Cited in the file of this patent

UNITED STATES PATENTS

| 1,858,769 | Erskine | May 17, 1932 |
| 2,232,897 | Winn | Feb. 25, 1941 |

FOREIGN PATENTS

| 556,357 | Germany | Aug. 23, 1932 |